United States Patent
Houston et al.

(10) Patent No.: US 9,479,502 B2
(45) Date of Patent: *Oct. 25, 2016

(54) RULE SETS FOR CLIENT-APPLIED ENCRYPTION IN COMMUNICATIONS NETWORKS

(71) Applicant: SURFEASY, INC., Toronto (CA)

(72) Inventors: Chris Houston, Toronto (CA); Athir Nuaimi, Toronto (CA)

(73) Assignee: SURFEASY, INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,874

(22) Filed: Apr. 27, 2015

(65) Prior Publication Data

US 2016/0021108 A1    Jan. 21, 2016

Related U.S. Application Data (63) Continuation of application No. 14/189,120, filed on Feb. 25, 2014, now Pat. No. 9,032,206.

(60) Provisional application No. 61/769,175, filed on Feb. 25, 2013.

(51) Int. Cl.
  *H04L 29/06* (2006.01)
  *H04W 12/02* (2009.01)

(52) U.S. Cl.
  CPC ....... *H04L 63/0876* (2013.01); *H04L 63/0272* (2013.01); *H04L 63/0428* (2013.01); *H04L 63/20* (2013.01); *H04L 63/205* (2013.01); *H04W 12/02* (2013.01)

(58) Field of Classification Search
  CPC ........... H04L 63/0876; H04L 63/0272; H04L 63/0428; H04L 63/20; H04W 21/02
  USPC ....................................................... 713/168
  See application file for complete search history.

(56) References Cited

U.S. PATENT DOCUMENTS

| | | | | |
|---|---|---|---|---|
| 7,353,541 | B1* | 4/2008 | Ishibashi | G06F 21/10 348/E7.056 |
| 7,949,735 | B2* | 5/2011 | Edwiges | H04L 41/046 709/222 |
| 8,126,925 | B2* | 2/2012 | Wendker | G06F 17/3056 707/795 |
| 2003/0084291 | A1* | 5/2003 | Yamamoto | H04L 63/02 713/168 |
| 2003/0212901 | A1* | 11/2003 | Mishra | H04L 63/0227 726/13 |
| 2004/0064731 | A1* | 4/2004 | Nguyen | H04L 12/2602 726/22 |
| 2004/0205243 | A1* | 10/2004 | Hurvig | G06Q 20/4014 709/245 |
| 2006/0056634 | A1* | 3/2006 | Lee | H04L 63/20 380/270 |
| 2007/0061488 | A1* | 3/2007 | Alagappan | G06F 17/30905 709/246 |

(Continued)

*Primary Examiner* — Michael S McNally
(74) *Attorney, Agent, or Firm* — Michael J. Andri (57) ABSTRACT

A rule set for client-applied encryption is created and deployed to a client device by a network device over a communications network. Encryption applied by the client in accordance with the rule set may form the basis of a secure connection in which encrypted information is encapsulated and tunneled across a network that includes a wireless or wired interface through which the client obtains network connectivity. The client may monitor operating conditions, including operating conditions of the communications network, client device, and/or service provider. The rule set includes one or more rules that may be used by the client in combination with the detected operating conditions to select the appropriate encryption protocol. The rule set may persist at the client for use over multiple sessions in which a range of communication protocols and/or access points are used by the client to obtain network connectivity.

20 Claims, 3 Drawing Sheets

(56) References Cited

U.S. PATENT DOCUMENTS

2007/0220305 A1* 9/2007 Isoyama ............ G06F 11/2023
   714/4.11

2013/0325726 A1* 12/2013 Tuchman ............. H04L 63/104
   705/304
2014/0169562 A1* 6/2014 Billonneau ......... H04L 63/0272
   380/270

* cited by examiner

RULE SETS FOR CLIENT-APPLIED ENCRYPTION IN COMMUNICATIONS NETWORKS

CROSS REFERENCE TO RELATED APPLICATIONS

The present application is a continuation application that claims the benefit of and priority to U.S. non-provisional application Ser. No. 14/189,120, filed Feb. 25, 2014, and titled RULE SETS FOR CLIENT-APPLIED ENCRYPTION IN COMMUNICATIONS NETWORKS, which is a non-provisional application that claims the benefit of and priority to provisional application Ser. No. 61/769,175, filed Feb. 25, 2013, and titled RULE SETS FOR CLIENT-APPLIED ENCRYPTION IN COMMUNICATIONS NETWORKS, the entire contents of each of these applications are incorporated herein by reference in their entirety for all purposes.

BACKGROUND

Various forms of data encryption may be applied to communications transmitted over a network for the purpose of securing information. The concept of the virtual private network (VPN), for example, typically relies on one or more forms of encryption in combination with a tunneling protocol to prevent or reduce disclosure of private information. Common encryption protocols used for VPNs include IPSec, SSL/TLS, MPPE, and SSTP to name a few examples. In the context of wireless networks such as Wi-Fi, for example, encryption over the air interface may take the form of WEP, WPA (including TKIP), or WPA2 (including CCMP), for example.

Various forms of encryption may be applied in combination and at one or more different levels of a protocol stack for network communications. For example, one form of encryption may be applied to data passing from a first layer that is encapsulated and encrypted using a different form of encryption that is applied at a second layer. Encryption protocols may be further defined as being either a point-to-point (e.g., transport level) encryption protocol or a message level encryption protocol, with each protocol having its own respective advantages and disadvantages.

Wireless devices such as smartphones, tablet computers, laptop computers, etc. have the benefit of being mobile. This mobility enables wireless devices to obtain network connectivity through a variety of different access points using a variety of different wireless protocols. Many wireless devices available today offer support for two, three, or more different wireless protocols. For example, many smartphones support 3G and 4G cellular protocols, Wi-Fi, and Bluetooth.

Additionally, network access points may be owned or operated by a variety of different entities, including publicly available cellular carriers with which a client accessing the network is a subscriber, publicly available cellular carriers with which the client accessing the network is not a subscriber, and private individuals and organizations that operate publicly accessible or private wireless networks. Each of these entities may implement different policies for their wireless networks, including different forms of security and rules for the data traversing their networks.

SUMMARY

A rule set for client-applied encryption is created and deployed to a client device by a network device over a communications network. Encryption applied by the client in accordance with the rule set may form the basis of a secure connection in which encrypted information is encapsulated and tunneled across a network that includes a wired or wireless interface through which the client obtains network connectivity. The client monitors operating conditions, including operating conditions of the communications network, client device, and/or service provider. The rule set includes one or more rules that may be used by the client in combination with the detected operating conditions to select the appropriate encryption protocol for the secure connection. The rule set may persist at the client over multiple sessions in which a range of communication protocols and/or access points are used by the client to obtain network connectivity. Rule sets may be at least partially defined by service providers and/or client device users.

DETAILED DESCRIPTION

As described in further detail with regards to the following detailed description and associated drawings, a client device may obtain a rule set from a network device that dictates or at least suggests when it is appropriate for the client devices to establish encrypted secure connections across a network. The rule set may include one or more rules that define a link between an encryption policy and the operating conditions that are to be present or non-present in order for the client device to engage a particular form of encryption used in establishing and maintaining a secure connection. The client device monitors the operating conditions of the communications network, the client device, and/or the service provider, and engages the appropriate encryption protocol to establish an encrypted secure connection or refrains from establishing the encrypted secure connection in accordance with the rule set and responsive to the operating conditions. The secure connection may take the form of a VPN connection, for example.

Figure 1A:
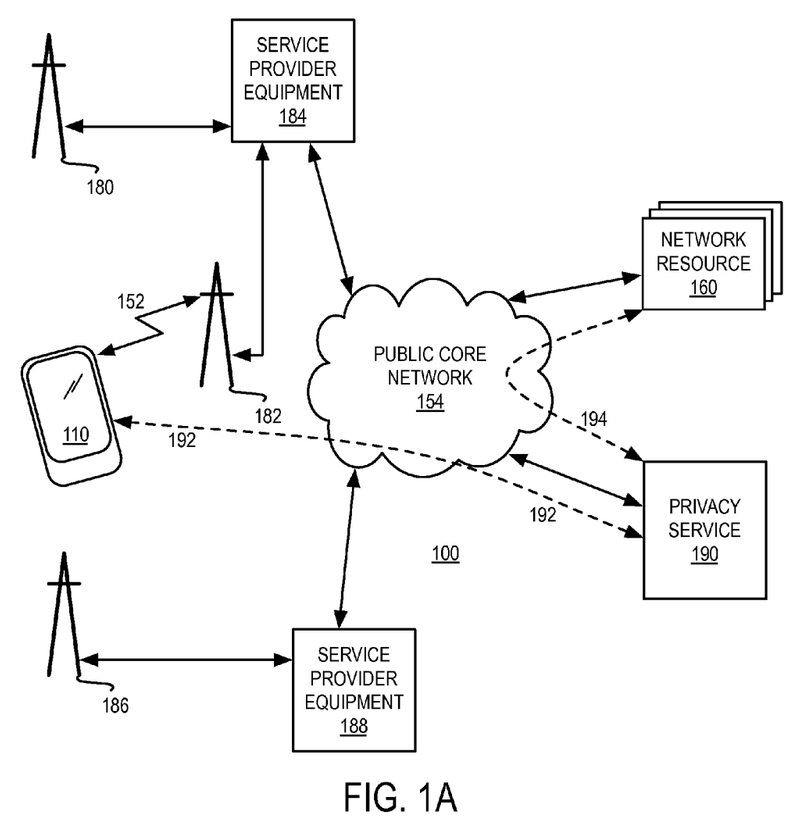
FIG. 1A is a schematic diagram depicting an example computing system.

FIG. 1A is a schematic diagram depicting an example computing system 100. Within computing system 100, client device 110 accesses network resources (e.g., network resource 160) over a public core network 154 via one or more access points (e.g., access points 180, 182, 186, etc.) and service provider equipment (e.g., 184, 188, etc.) linking the access points to the public core network. Network resources may include a service that the client device accesses in order to obtain information, post information, communicate with other client devices, or obtain enhanced network functionality.

As one example, client device 110 may take the form of a wireless computing device that communicates with wireless access point 182 over a wireless air interface 152. Client device 110 may obtain network connectivity through other access points, such as wireless access points 180 and/or 186 if client device 110 is within their respective wireless coverage areas. Furthermore, client device 110 may obtain network connectivity through wired interfaces with other access points. These various access points may be operated by two or more different entities in some scenarios. For example, in FIG. 1, access points 180 and 182 may be operated by the same entity that also operates service provider equipment 184. By contrast, access point 186 may be operated by a different entity than access points 180 and 182. Furthermore, separate and distinct entities may operate an access point and the service provider equipment through which that access point obtains connectivity with the public core network. For example, access point 186 may be operated by different entity than the entity that operates service provider equipment 188. An service provider may be identified and distinguished from other service providers by a respective service provider identity, which may take any suitable form, including a name, unique identifier, code, or other suitable value or form of information.

In some scenarios, client device 110 may access network resources (e.g., network resource 160) via an intermediate entity referred to in FIG. 1 as privacy service 190. As one example, client device 110 may be authenticated at privacy service 190 to obtain one or more additional services. Once authenticated, these additional services may include privacy or security services, proxy services, SSL re-direct services, antivirus services, ad-blocking services, anonymization services, or other suitable services.

For example, client device 110 may access network resource 160 by making a request (indicated by path 192) to privacy service 190, which in turn issues a request (indicated by path 194) to network resource 160 on-behalf of client device 110. Alternatively, privacy service 190 may redirect client device 110 to a secure SSL connection available at network resource 160. Network resource 160 may respond to such requests by issuing a response (indicated again by path 194) to privacy service 190 (or to client device 110 in the case of an SSL redirect), which in turn issues a response (indicated again by path 192) to client 110. In at least some implementations, privacy service 190 may terminate connections and initiate new connections between and on-behalf of clients and network resources, and may filter and/or augment communications exchanged between client device 110 and the network resource.

In FIG. 1A, path 192 may take the form of an encrypted tunneling connection that spans from client 110 to privacy service 190, and which traverses a wireless air interface, one or more wireless access points, service provider equipment, and the public core network. In this example, information encapsulated within the encrypted communications sent over the tunneled connection are not available for inspection by the service provider(s) or other entities operating the access point, service provider equipment, and/or equipment supporting the public core network. Path 194 between privacy service 190 and network resources may also take the form of an encrypted tunneling connection if supported by the network resource.

The inability for intermediaries to inspect the encrypted communications tunneled over intermediate network equipment may, at times, potentially result in a reduction in the quality of service (QoS) or other network functionality with respect to the client's communications or the communications of third parties traversing the intermediate network equipment. The impact of encrypted communications tunneled over the network on QoS or other forms of network functionality may be influenced by the type of encryption that is applied to the communications as well as the operating conditions of the communications network itself, including the wireless protocol used at the air interface, service provider identity, etc. The rule sets described herein may address these and other issues by prescribing or at least suggesting to the client device whether encryption is to be applied at the client, and the type of encryption to be applied responsive to operating conditions.

Figure 1B:
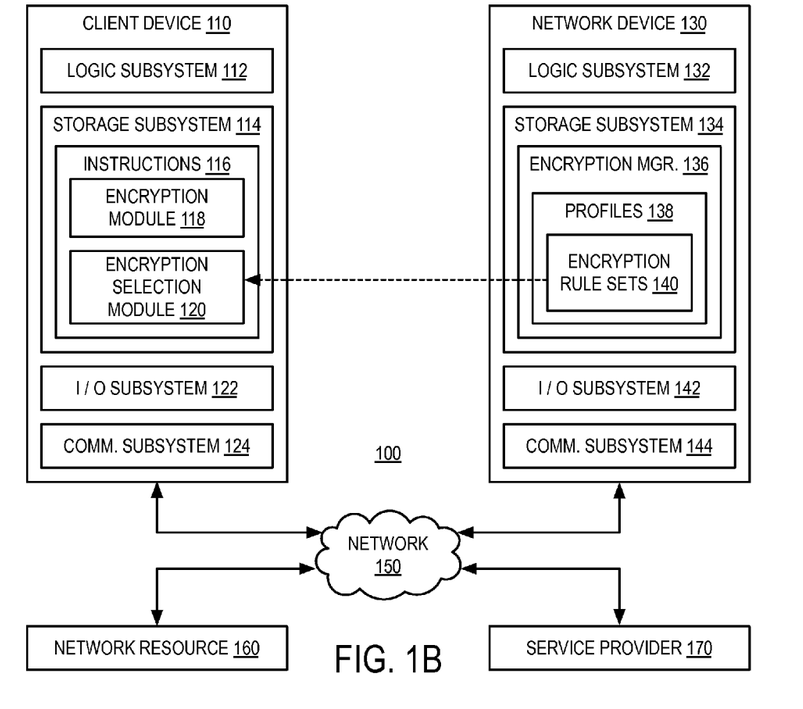
FIG. 1B is a schematic diagram depicting another view of the example computing system of FIG. 1A.

FIG. 1B is a schematic diagram depicting another view of example computing system 100. Computing system 100 again includes one or more client devices, such as example client device 110, communicating with one or more network devices via a communications network 150. Communications network 150 includes public core network 154 of FIG. 1A and further includes the wireless access points and/or service provider equipment by which client devices access the public core network. An example network device 130 is depicted in FIG. 1B. Additional network devices may host, include, or otherwise support network resources, such as example network resource 160 and/or service provider entities or other network operators that implement policies on their networks, depicted by example service provider 170.

Communications over network 150 that are attributed to client device 110, including communications transmitted by client device 110 and/or communications received by client device 110 may be encrypted according to one or more encryption protocols, or may not be encrypted in some conditions. Client device 110 may include one or more encryption modules, such as example encryption module 118 to encrypt and/or decrypt communications. Client device 110 may further include an encryption selection module 120 to select an appropriate encryption and/or decryption protocol to be applied to communications by encryption module 118. As will be described in greater detail with reference to FIG. 2, encryption selection module 120 may select an encryption and/or decryption protocol based on one or more rules of a rule set.

A rule set may be deployed to client device 110 by a network device, such as example network device 130 that hosts an encryption manager 136. As one example, network device 130 may correspond to the network device that terminates a secure connection (e.g., a VPN connection or other suitable secure connection) with the client device, or network device 130 may be associated with or in coordinated-control with the network device that terminates the secure connection. For example, network device 130 may be operated by the same entity that operates the network device that terminates the secure connection with the client device. However, in other examples, network device 130 may reside at any suitable location in the network and may be operated by a service provider or by a third party entity that coordinates encryption policy across multiple service providers.

Encryption manager 136 may manage and deploy respective encryption rule sets to numerous client devices over network 150. In the context of FIG. 1A, encryption manager 136 or separate instances thereof may reside at or be hosted by one or more of privacy service 190, service provider equipment 184 and/or 188, access points 180, 182, 186, or at other suitable network devices within network 150 or in communication with network 150. Hence, while a single instance of encryption manager 136 and a single instance of a client device are depicted, this example is non-limiting as real-world use-scenarios may involve numerous encryption managers located at separate network devices throughout the network to service thousands, millions, billions, or more geographically diverse clients.

Figure 2:
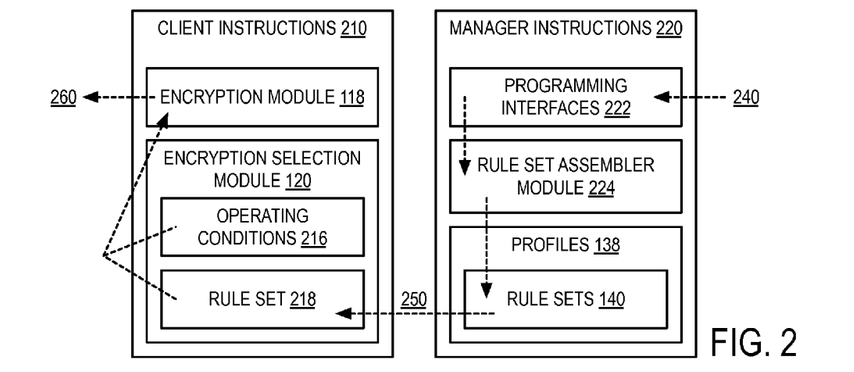
FIG. 2 is a schematic diagram depicting an example interaction between a client subsystem and a manager subsystem.

FIG. 2 is a schematic diagram depicting an example interaction between a client subsystem represented by client instructions 210 and an encryption manager subsystem represented by manager instructions 220. As a non-limiting example, client instructions 210 may form part of previously described instructions 116 of client device 110, and manager instructions 220 may form part of encryption manager 136 of network device 130. In other examples, these subsystems may be distributed across or between two or more network entities, or may be combined in other examples.

In FIG. 2, information 240 defining one or more aspects of a rule set is received by the manager subsystem. For example, manager instructions 220 may include or otherwise support a programming interface 222 by which rule set definitions may be received from remote computing devices. Manager instructions 220 may include a rule set assembler module 224 that receives information 240, assembles rule sets (e.g., rule sets 140) based on information 240, and associates the rule sets with client and/or service provider profiles 138. Rule sets 140 may be deployed to client devices over communications networks as indicated at 250. An example rule set 218 of rule sets 140 is depicted as being transmitted to and received by the client subsystem in FIG. 2.

Client instructions 210 may include encryption selection module 120 that obtains a rule set (e.g., rule set 218), monitors operating conditions 216 of a communications network, the client device, and/or the service provider operating the communications network or a portion thereof, and applies encryption at the client device to network communications responsive to the operating conditions and in accordance with the rule set. For example, encryption selection module 120 directs an encryption module 118 responsible for applying a selected encryption protocol to encrypt communications 260 transmitted by the client device over the communications network. Client instructions 210 may include a number of encryption modules, each being responsible for applying a particular encryption protocol to the client's network communications. It will be understood that the encryption applied by encryption module 118 may be in addition to one or more other forms of encryption applied at one or more other layers of a protocol stack. For example, the encryption applied by encryption module may form the basis of a secure connection with a network entity located on the opposite side of an air interface of a wireless network.

In at least some implementations, a rule set includes one or more rules that define a link between an encryption policy and the operating conditions that are to be present or non-present in order for the client device to engage a particular form of encryption used in establishing and maintaining a secure connection. As one example, a rule set may include a rule that states that the client device is to apply encryption to communications for the purpose of establishing and maintaining a secure connection if a particular operating condition or set of operating conditions are or are not present. This rule may be applied in combination with another rule of the rule set that states that the client device is not to apply encryption to communications for the purpose establishing or maintaining a secure connection if another operating condition or set of operating conditions are or are not present.

A rule set may include any suitable number and combination of rules, and such rules may include any suitable structure or rule application process flow. A rule set may define one or more classes of wireless and/or wired communication protocols with each class having its own independent combination of rules and rule application process flow. The client device, in implementing a rule set, may act as a classifier by identifying the applicable wireless or wired protocol over which the client device is to obtain network connectivity, and implementing the rules specific to that class.

As one example, for a Wi-Fi class of wireless networks, operating conditions applicable to the determination of whether encryption is to be applied and/or the form of encryption may include whether the network is a public network or carrier managed, whether the Wi-Fi SSID or other identifier is within a particular range or list of identifiers, whether the Wi-Fi connection supports WAP or WAP2, etc. As another example, for a cellular network class of wireless networks, operating conditions applicable to the determination of whether encryption is to be applied and/or the form of encryption may include whether the cellular network supports 3G or 4G wireless protocols, whether the client device is roaming, the identity of the client's service provider vs. the service provider operating the cellular network, etc. Other suitable operating conditions may be applicable to the determination of whether encryption is to be applied and/or the form of encryption, including the geographic location (e.g., specified cities, countries, etc.) of the client device, the geographic location of the access point, services associated with a profile of the client device including services residing at or supported by the network device that terminates the secure connection. Example services may include the services previously described with reference to privacy service 190 of FIG. 1A.

While FIGS. 1B and 2 depict aspects of encryption manager 136, including rule set assembler module 224, residing at a network device 130 that is remote from client device 110, in some implementations, aspects of encryption manager 136 (e.g., such as rule set assembler module 224) may alternatively or additionally reside at client device 110, and may form part of client instructions 210. For example, client instructions 210 may be responsible for receiving information 240 and assembling some or all of rule set 218.

Figure 3:
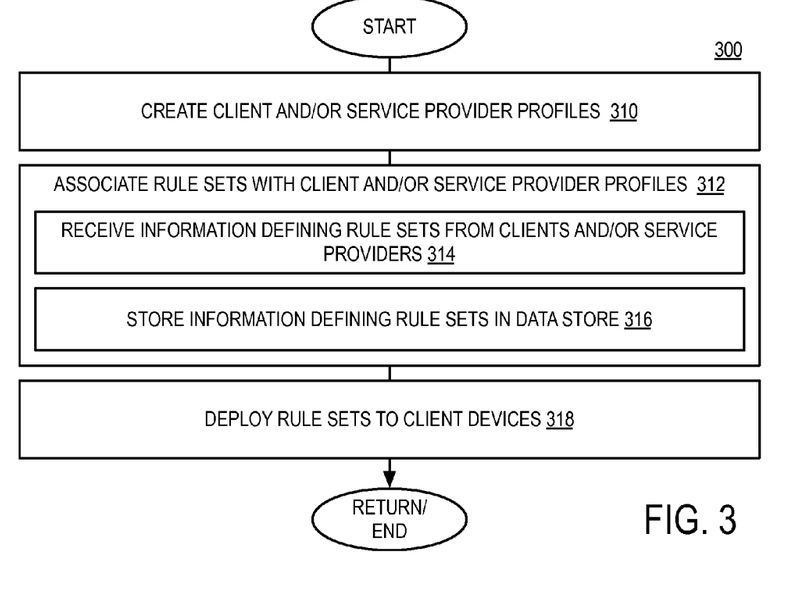
FIG. 3 is a flow diagram depicting an example method for creating and deploying a rule set for client-applied encryption.

FIG. 3 is a flow diagram depicting an example method 300 for creating and deploying a rule set for client-applied encryption, particularly with respect to encryption applied to establish and/or maintain an encrypted secure connection. As one example, method 300 may be performed by an encryption manager, such as example encryption manager 136 residing at network device 130 in FIG. 1. However, it should be understood that method 300 may be performed, in part or in its entirety, by a client device. In this case, an encryption manager may reside at client device 110 or aspects of method 300 may be performed by encryption selection module 120 residing at client device 110.

At 310, the method includes creating client and/or service provider profiles. Client profile information may be received or otherwise obtained from a client device. Client profile information may be user-defined in some implementations, and may include an indication of services subscribed to by the client device (e.g., such as at privacy service 190). Service provider profile information may be received or otherwise obtained from a network device or client device associated with a service provider (e.g., represented by example service provider 170 in FIG. 1B). Service provider information may be defined by service provider personnel in some implementations. Client profile information and/or service provider profile information may be received via a programming interface in some examples, such as previously described with reference to information 240 of FIG. 2.

At 312, the method includes associating one or more rule sets with respective client and/or service provider profiles. For example, at 314, information defining rule sets may be received from clients and/or service providers, and the information defining the rule sets may be stored in a data store. The method at 312 may additionally include assembling rule sets from the information received at 314, for example, as previously described with reference to rule set assembler module 224. Individual or groups of clients and service providers may be represented by respective identifiers to enable such entities to be distinguished from each other.

At 318, the method may include deploying one or more rule sets to one or more respective client devices over a communications network. Any suitable technique may be used to deploy a rule set to a client device. In one example, a rule set may be published to a network location accessible to a client device to which the rule set is to be applied. As another example, rule sets may be requested by client devices, and may be transmitted to the client devices responsive to the requests. As yet another example, the rule sets may be deployed to the client devices in the form of software or firmware, or an update to an instruction set residing at the client device. In some examples, operation 318 may be omitted if the rule set has been assembled at and/or by the client device.

Authentication may be used to ensure that individual clients are properly identified (e.g., as respective client identities) prior to deploying the appropriate rule set associated with the client's profile to that client and/or to establish secure connections with the client during an active session. As previously described, individual clients (i.e., individual client identities) may be identified and distinguished from each other by identifiers (e.g., globally unique or domain unique identifiers) that enable the encryption manager to associate the appropriate rule set and client profile with an individual client. Alternatively or additionally, client group identifiers may be associated with groups of clients to enable application of encryption policy across the group of clients using a common rule set. Hence, each client device may potentially be associated with a different rule set or groups of clients having a shared attribute may be associated with the same rule set or a rule set that includes a shared rule or set of rules.

Figure 4:
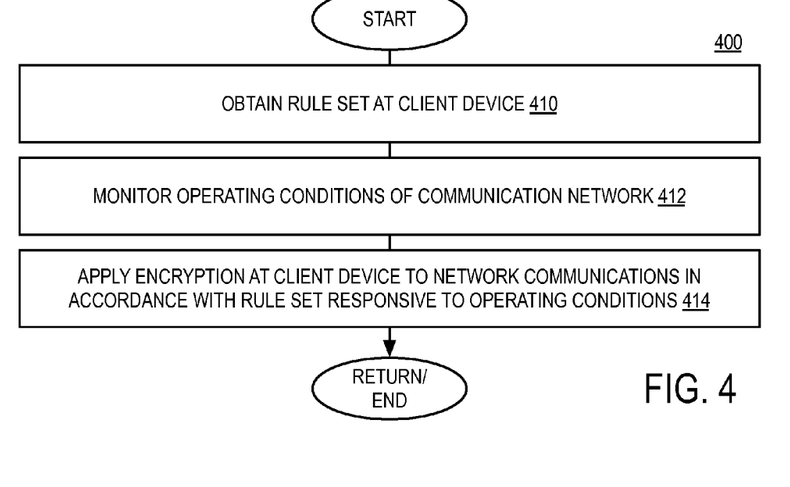
FIG. 4 is a flow diagram depicting an example method for obtaining and applying a rule set for client-applied encryption.

FIG. 4 is a flow diagram depicting an example method 400 for obtaining and applying a rule set for client-applied encryption. In one example, method 400 may be performed by a client device, such as example client device 110 of FIG. 1. For example, method 400 may be performed in part or in its entirety by an encryption selection module residing at the client device.

At 410, the method includes obtaining a rule set at a client device. As previously described with reference to method 300 of FIG. 3, a rule set may be deployed to a client device using a variety of techniques. For example, the client device may receive the rule set over a communications network. Alternatively or additionally, the client device may obtain the rule set by assembling the rule set or portions of the rule set at the client device. For example, the client device may receive service provider-defined aspects of the rule set over a communications network, and may combine the service provider-defined aspects of the rule set with client-defined aspects of the rule set to obtain a combined rule set.

At 412, the method includes monitoring operating conditions of a communications network, the client device, and/or the service provider operating the communications network or a portion thereof. As one example, the communications network that is monitored by the client may include some or all portions of the network over which a secure connection is established for the client. As another example, the communications network may include or take the form of a wireless and/or wired network between the client device and one or more access points. Examples of operating conditions that may be monitored include: (1) an identity of the client's wireless and/or wired service provider (including service provider settings), (2) an identity of a service provider through which the client obtains network connectivity (including service provider settings), (3) whether the client is currently roaming or in a home network, (4) whether the access point or other intermediate network equipment is managed by a particular service provider, or managed by an alternative or unrecognized entity, (5) an identity of the access point and/or radio access network, (6) a wireless or wired protocol by which the client is obtaining network connectivity over an air interface, (7) a geographic location of the client device and/or access point, (8) whether the client has subscribed to particular services at a terminating point of the secure connection (e.g., at privacy service 190), (9) whether additional forms of encryption have been or will be applied to the communications, (10) whether the communications link between the client device and the access point is a wired or wireless link, (11) client device identity and/or user identity (including client/user settings), (12) IP address of the client device, which indicates where the client device is connecting from (country, corporate network, etc.), (13) failure or blocking of a previous session by a service provider or intermediate network device (e.g., where the client device is located at the same or similar geographic or network location previously and some of the forms of encryption where previously blocked), or (14) other suitable operating conditions.

At 414, the method includes applying encryption at the client device to network communications responsive to the operating conditions identified at 412 and in accordance with the rule set obtained at 410. The encrypted network communications (if encryption is applied) may include the communications transmitted by the client device over the communications network. For example, in the context of a wireless communications network, the wireless communications transmitted by the client device to one or more access points may be encrypted by an application program or operating system as part of establishing or maintaining a secure connection. This secure connection may terminate at any suitable location, including at the access point, at network equipment located on the network side of the access point, or at a privacy service (e.g., privacy service 190). Connections established or maintained using a selected encryption protocol may also be supported on the downlink to the client device by the network device terminating the secure connection. In such case, communications received by the client device may be decrypted using decryption tools associated with the selected encryption protocol.

The rule set obtained by the client device may persist at the client device over multiple sessions during which a range of wireless and/or wired communication protocols and/or wireless and/or wired access points may be used by the client to obtain network connectivity. For example, the client device may utilize the rule set for a prescribed period of time while moving between or among different access points, or indefinitely until an updated rule set is deployed to the client device or the client device updates the rule set responsive to changes in client and/or service provider profile settings.

The method 400 of FIG. 4 may be implemented by the client device in a variety of ways. In one example, a client device may monitor and identify a plurality of access points through which the client device may obtain network connectivity. The encryption protocol selected by the client device responsive to the operating conditions may include consideration of the plurality of access points and their respective encryption protocols that they support. In such case, the client device may select a particular access point from a plurality of access points in accordance with the rule set. Here, the rule set may dictate or suggest a hierarchy of encryption protocols to be selected by the client device, which in turn may inform the client device with respect to which access point to select.

Referring again to FIG. 1B, client device 110 takes the form of a computing device that includes a logic subsystem 112 to perform the methods and operations. As one example, logic subsystem 112 may perform these methods and operations by executing instructions 116 held in a storage subsystem 114. In this example, logic subsystem 112 includes one or more physical processor devices and/or other suitable logic devices. Additionally or alternatively, logic subsystem 112 may include other suitable electronic device components that collectively enable logic subsystem 112 to perform the methods and operations described herein.

Client device 110 may include a computing device, such as a smartphone, tablet computer, laptop or notebook computer, desktop computer, mobile computer, gaming console, network enabled household device, or wearable device, among other suitable computing devices. In an example use-scenario, a human user operates client device 110 to retrieve, interact with, or otherwise access network resources. Network resource 160 may represent a file or collection of files downloaded or streamed by client device 110 over network 150, a communications session between one or more other client devices over network 150, or a network-based service (i.e., cloud-based service) accessible to client device 110 over network 150, among other suitable network resources.

Storage subsystem 114 may include one or more memory devices, hard drives, removable storage media, and/or peripheral storage devices accessible to client device 110. Instructions 116 and/or 210 of FIGS. 1B and 2 may include or take the form of software and/or firmware. Examples of software include an operating system, an application program, a plug-in, a software update or software portion, or combinations thereof. Instructions 116 are executable by a logic subsystem of one or more computing devices to perform one or more of the methods, processes, and/or operations described herein.

Client device 110 may include or otherwise interface with an input/output subsystem 122 that includes or supports one or more input devices and one or more output devices. Examples of input devices include a touch-screen display, a keyboard or keypad, a pointing device such as a mouse or a controller, a microphone, and/or an optical sensor, among other suitable input devices. Examples of output devices include a graphical display, a touch-screen display, an audio speaker, and/or a haptic feedback device (e.g., a vibration motor), among other suitable output devices. Client device 110 may include or otherwise interface with a communications subsystem 124 that supports wired and/or wireless communications with a communications network, such as example network 150. Communications subsystem 124 may include one or more transceivers, transmitters, receivers, filters, amplifiers, and/or other suitable electronic devices. Communications subsystem 124 may support any suitable communications protocol. Example communications protocols include wireless protocols such as 3G (e.g., UMTS, etc.), 4G (e.g., LTE, Wi-Max, etc.), Wi-Fi, Bluetooth, etc. as well as wired TCP/IP protocols.

Network device 130 may take the form of a computing device, such as a server or other suitable network appliance. Network device 130 includes a logic subsystem 132 to execute instructions held in storage subsystem 134. These instructions may include encryption manager 136. Network device 130 further includes an input/output subsystem 142 and a communications subsystem 142 that interfaces with network 150.

Network 150 may include one or more of a wide area network, a local area network, and/or a personal area network. A wide area network may include the Internet or a portion thereof, wireless cellular air-interface networks, core IP networks, cellular back-haul networks providing communications between wireless access points and core networks, etc. Network device 130 may take the form of a node of a service provider within a radio network controller or a gateway device, or may be located within the core network beyond the equipment of a service provider. The encryption manager of network device 130 may serve a single service provider, a single client device, or a group of service providers and/or a group of client devices, etc.

It will be understood that the embodiments, implementations, and scenarios described by way of example herein are illustrative and not restrictive. The scope of the invention or inventions is defined by the claims, now or later presented, rather than by these examples. All changes that fall within the metes and bounds of the claims, and the equivalence of such metes and bounds are embraced by the claims.

The invention claimed is:

1. A method performed by a computing system including one or more computing devices hosting a virtual private network service, the method comprising:
   receiving, at the computing system, a service provider-defined rule set attributed to a service provider identity for encrypting virtual private network communications carried over a service provider-operated portion of a wide area communications network via the virtual private network service;
   authenticating a client identity accessing the virtual private network service over the wide area network via a client device; and
   transmitting the service provider-defined rule set to the client device over the wide area communications network following authentication of the client identity;
   wherein the service provider-defined rule set defines, in combination with a client-defined rule set residing at the client device, an encryption policy to be applied at the client device, based on one or more operating conditions of the wide area communications network, for virtual private network communications originating at or requested by the client device that traverse the service provider-operated portion of the wide area communications network via the virtual private network service.

2. The method of claim 1, wherein the service provider-defined rule set includes one or more rules that define a link between each encryption policy and a subset of the one or more operating conditions that are to be present or non-present in order for the client device to apply that encryption policy.

3. The method of claim 1, wherein the one or more operating conditions of the wide area communications network are monitored and detected by the client device.

4. The method of claim 1, wherein transmitting the service provider-defined rule set from the computing system to the client device includes transmitting the service provider-defined rule set as an update to an instruction set residing at the client device.

5. The method of claim 1, wherein transmitting the service provider-defined rule set from the computing system to the client device includes transmitting the service provider-defined rule set responsive to a request received from the client device over the wide area communications network.

6. The method of claim 1, wherein the one or more operating conditions of the wide area communications network include an identity of a wireless service provider of a wireless communications network over which the client device accesses the virtual private network service.

7. The method of claim 1, wherein the one or more operating conditions of the wide area communications network include whether the wide area communications network includes a wireless communications network component.

8. The method of claim 1, wherein the one or more operating conditions of the wide area communications network include a wireless protocol of a wireless communications network over which the client devices accesses the virtual private network service.

9. The method of claim 1, wherein the one or more operating conditions of the wide area communications network include a geographic location of a wireless access point by which the client device obtains network access to the wide area communications network.

10. The method of claim 1, wherein the service provider-defined rule set defines, in combination with the client-defined rule set, the encryption policy to be applied at the client device, further based on whether the client device is roaming or a geographic location of the client device.

11. The method of claim 1, wherein the encryption policy includes a form of encryption or an encryption protocol of the virtual private network communications, or whether encryption is applied to the virtual private network communications.

12. The method of claim 1, wherein the encryption policy includes a form of tunneling or a tunneling protocol, or whether tunneling is applied to the virtual private network communications.

13. The method of claim 1, further comprising:
facilitating the virtual private network communications between the client device and a network resource over the wide area communications network via the virtual private network service using the encryption policy applied at the client device by decrypting encrypted communications originating at and received from the client device that are destined for the network resource and/or by encrypting communications requested by the client device and received from the network resource that are destined for the client device.

14. A computing system, comprising:
one or more network computing devices having a logic subsystem and a storage subsystem, the storage subsystem having instructions defining a virtual private network service stored thereon, the instructions executable by the logic subsystem to:
receive, via a programming interface of the virtual private network service, a service provider-defined rule set attributed to a service provider identity for encrypting virtual private network communications carried over a service provider-operated portion of a wide area communications network via the virtual private network service;
authenticate a client identity accessing the virtual private network service over the wide area network via a client device; and
transmit the service provider-defined rule set to the client device over the wide area communications network following authentication of the client identity;
wherein the service provider-defined rule set defines, in combination with a client-defined rule set residing at the client device, an encryption policy to be applied at the client device, based on one or more operating conditions of the wide area communications network, for virtual private network communications originating at or requested by the client device that traverse the service provider-operated portion of the wide area communications network via the virtual private network service.

15. The computing system of claim 14, wherein the instructions are further executable by the logic subsystem to:
facilitate the virtual private network communications between the client device and a network resource over the wide area communications network via the virtual private network service using the encryption policy applied at the client device by decrypting encrypted communications originating at and received from the client device that are destined for the network resource and/or by encrypting communications requested by the client device and received from the network resource that are destined for the client device.

16. The computing system of claim 14, wherein the service provider-defined rule set includes one or more rules that define a link between each encryption policy and a subset of the one or more operating conditions that are to be present or non-present in order for the client device to apply that encryption policy.

17. The computing system of claim 14, wherein the one or more operating conditions of the wide area communications network are monitored and detected by the client device.

18. The computing system of claim 14, wherein the service provider-defined rule set is transmitted to the client device as an update to an instruction set residing at the client device.

19. The computing system of claim 14, wherein the service provider-defined rule set is transmitted to the client device responsive to a request received from the client device over the wide area communications network.

20. The computing system of claim 14, wherein the one or more operating conditions of the wide area communications network include at least one of: (1) an identity of a wireless service provider of a wireless communications network over which the client device accesses the virtual private network service, (2) whether the wide area communications network includes a wireless communications network component, (3) a wireless protocol of a wireless communications network over which the client devices accesses the virtual private network service, (4) a geographic location of a wireless access point by which the client device obtains network access to the wide area communications network; and
wherein the encryption policy includes at least one of: (1) a form of encryption or an encryption protocol of the virtual private network communications, (2) whether encryption is applied to the virtual private network communications, (3) a form of tunneling or a tunneling protocol, (4) whether tunneling is applied to the virtual private network communications.

* * * * *